(12) United States Patent
Inoue et al.

(10) Patent No.: US 8,905,880 B2
(45) Date of Patent: Dec. 9, 2014

(54) CHAIN CONNECTING PIN

(75) Inventors: Kenkichi Inoue, Osaka (JP); Tsuyoshi Fukumori, Osaka (JP); Toshinari Oishi, Osaka (JP)

(73) Assignee: Shimano Inc., Osaka (JP)

(*) Notice: Subject to any disclaimer, the term of this patent is extended or adjusted under 35 U.S.C. 154(b) by 255 days.

(21) Appl. No.: 13/567,789

(22) Filed: Aug. 6, 2012

(65) Prior Publication Data
US 2014/0038759 A1 Feb. 6, 2014

(51) Int. Cl.
*F16G 13/06* (2006.01)
(52) U.S. Cl.
USPC .......................................... 474/234
(58) Field of Classification Search
CPC ............ F16G 13/07; B62M 9/00; B21L 1/00
USPC .............................. 474/234; 411/2, 4; 59/1, 7
See application file for complete search history.

(56) References Cited

U.S. PATENT DOCUMENTS

| 4,494,945 | A | * | 1/1985 | Ogino ........................... 474/231 |
| 4,998,907 | A | | 3/1991 | Sawada et al. |
| 7,216,472 | B1 | * | 5/2007 | Wang ................................ 59/7 |
| 8,317,443 | B2 | * | 11/2012 | Stauch et al. ..................... 411/5 |

FOREIGN PATENT DOCUMENTS

| DE | 69004278 T2 | 3/1994 |
| EP | 0634811 A1 | 1/1995 |
| EP | 2071201 A1 | 6/2009 |

* cited by examiner

*Primary Examiner* — William E Dondero
*Assistant Examiner* — Robert T Reese
(74) *Attorney, Agent, or Firm* — Global IP Counselors

(57) ABSTRACT

A chain connecting pin basically includes a pin body, a connecting portion and an inserting portion. The pin body has a first axial end face and a second axial end face, the second axial end face having a recessed surface with respect to an outermost edge of the second axial end face. The connecting portion is attached to the recessed surface of the second axial end face of the pin body. The inserting portion is attached to the connecting portion.

12 Claims, 5 Drawing Sheets

CHAIN CONNECTING PIN

BACKGROUND

1. Field of the Invention

This invention generally relates to a chain connecting pin. More specifically, the present invention relates to a chain connecting pin that interconnects link plates together.

2. Background Information

Most bicycles have a drive train that uses a chain to transmit the pedaling action from the rider to the rear wheel. Bicycle chains have a plurality of inner links and a plurality of outer links that are interconnected in an alternating manner by a plurality of connecting pins. Typically, each of the inner links includes a pair of parallel inner link plates having pin holes at opposite ends. Likewise, each of the outer links includes a pair of parallel outer link plates having pin holes at opposite ends. These inner and outer link plates are overlapped at their ends so as to align the respective corresponding pin holes with each other. Then, a connecting pin is forcibly inserted into the common pin holes defined by the overlapped inner and outer link plates. In order to form a single continuous chain, a pair of the outer link plates and a pair of the inner links are connected together by a releasable connecting link, which is often called a master chain link.

SUMMARY

Generally, the present disclosure is directed to various features of a chain connecting pin. In one feature, a chain connecting pin is provided which permits easier pin connecting operation while also results in a pin that reliably does not protrude outward from a pin body after the pin connecting operation is completed.

In view of the state of the known technology, a chain connecting pin is provided that basically comprises a pin body, a connecting portion and an inserting portion. The pin body has a first axial end face and a second axial end face, the second axial end face having a recessed surface with respect to an outermost edge of the second axial end face. The connecting portion is attached to the recessed surface of the second axial end face of the pin body. The inserting portion is attached to the connecting portion.

Other objects, features, aspects and advantages of the disclosed chain connecting pin will become apparent to those skilled in the art from the following detailed description, which, taken in conjunction with the annexed drawings, discloses a preferred embodiment of the chain connecting pin.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
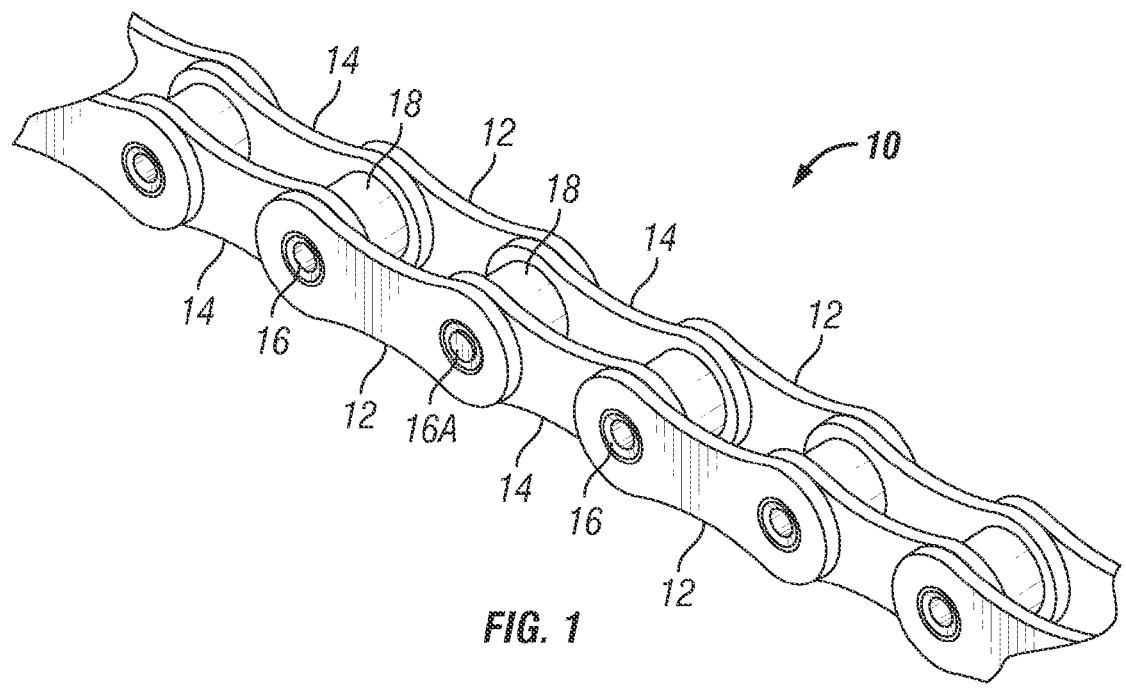
FIG. 1 is a perspective view of a portion of a bicycle chain that is includes a plurality of bicycle chain connecting pins interconnecting inner and outer link plates in accordance with one embodiment.
Figure 2:
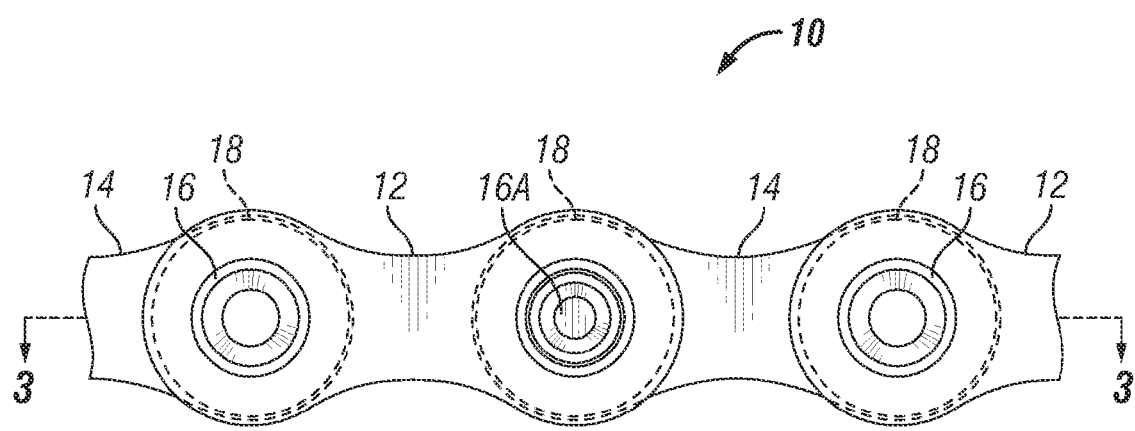
FIG. 2 is a side elevational view of a portion of the bicycle chain that is illustrated in FIG. 1.
Figure 3:
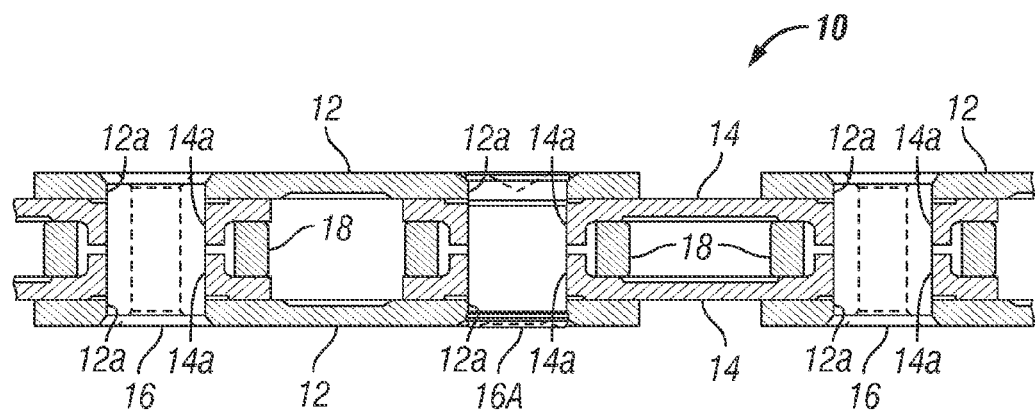
FIG. 3 is a cross sectional view of the portion of the bicycle chain that is illustrated in FIG. 2 as seen along section line 3-3 of FIG. 2.
Figures 4, 5:
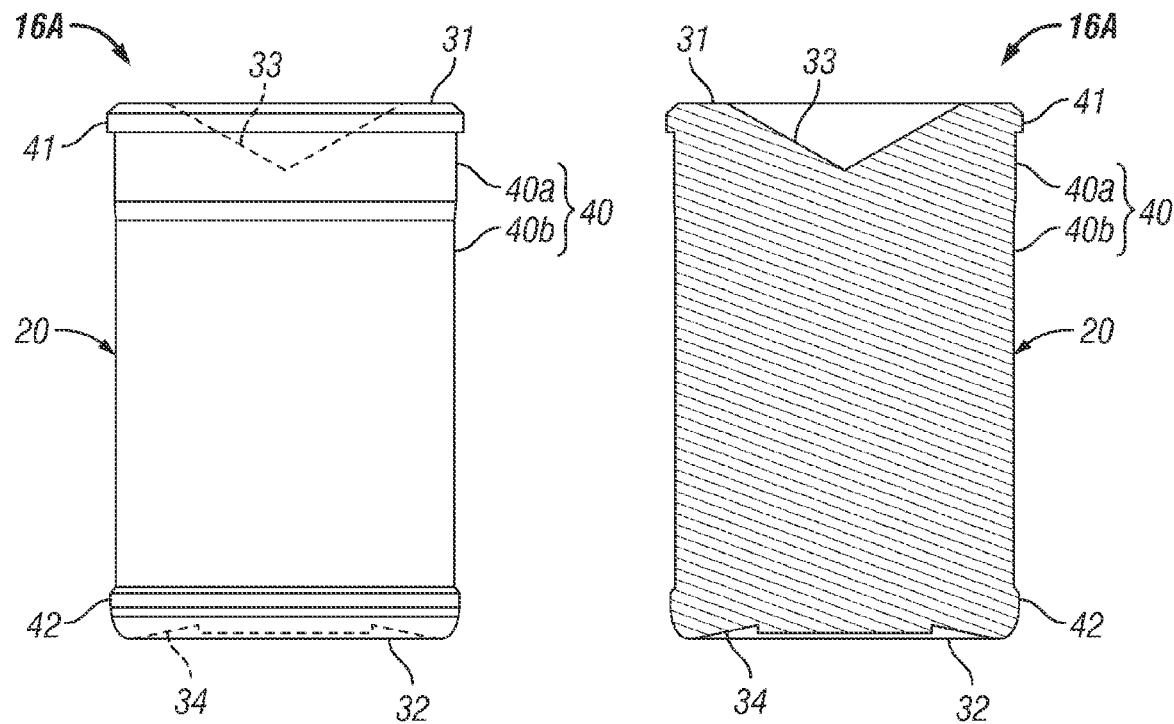
FIG. 4 is a side elevational view of one of the bicycle chain connecting pins of the bicycle chain that is illustrated in FIGS. 1 to 3.
FIG. 5 is a longitudinal cross sectional view of the bicycle chain connecting pin that is illustrated in FIG. 4.

Referring initially to FIGS. 1 to 3, a portion of a bicycle drive chain 10 is illustrated in accordance with a first embodiment. As used herein to describe the parts of the bicycle drive chain 10, the following directional terms "inside", "outside", "inner", "outer", "above", "below", "width", and "longitudinal" as well as any other similar directional terms refer to those directions relative to the bicycle drive chain 10 in an installed position on a bicycle that is upright on a horizontal surface. The bicycle drive chain 10 basically includes a plurality of outer link plates 12, a plurality of inner link plates 14 and a plurality of connecting pins 16 and a plurality of rollers 18. The outer link plates 12, the inner link plates 14, the connecting pins 16 and the rollers 18 are metal parts that are well known in the bicycle chain field. The rollers 18 are disposed on the chain connecting pins 16 to rotate on the chain connecting pins 16. Since the outer link plates 12, the inner link plates 14, the chain connecting pins 16, the rollers 18 are well known structures, they will not be discussed and/or illustrated in detail herein, except as needed to explain the construction of the bicycle drive chain 10. Of course, it will be apparent to those skilled in the art from this disclosure that these parts can vary as needed and/or desired.

In order to form a single continuous chain loop, an end pair of the outer link plates 12 and an end pair of the inner links 14 are connected together by a chain connecting pin 16A as best seen in FIG. 3. The chain connecting pin 16A is a solid pin, which is installed in a different manner than the chain connecting pins 16, as discussed below. Similar to chain connecting pins 16, one of the rollers 18 is also disposed around the chain connecting pin 16A. The chain connecting pins 16 are illustrated as hollow cylinders with a tapered portion at each end so that the chain connecting pins 16 can be easily deformed at each end. However, the connecting pins 16 could be solid pins if needed and/or desired.

As seen in FIG. 3, each of the outer link plates 12 has a pair of pin openings 12a for receiving the chain connecting pins 16 or 16A. Similarly, each of the inner link plates 14 has a pair of pin openings 14a for each receiving one of the chain connecting pins 16 or 16A, The inner link plates 14 have integrated (swaged) bushings forming the pin openings 14a. Of course, separate bushings can be used if needed and/or desired. Basically, inner end faces of the outer link plates 12 are overlapped on outer end faces of the inner link plates 14 with respective ones of the pin openings 12a and 14a being aligned. Then, first, the chain connecting pins are inserted through the pin openings 12a and 14a so as to connect the inner link plates 14 and the outer link plates 12 with each other to form an elongated chain of a prescribed length. Finally, the chain connecting pin 16A is then used to interconnect the end pair of the outer link plates 12 and the end pair of the inner links 14 together to form a continuous loop. Thus, each opposed pair of the outer link plates 12 connected together by two of the chain connecting pins 16, or one of the chain connecting pins 16 and the chain connecting pin 16A, to form an outer link. Likewise, each opposed pair of the inner link plates 14 connected together by two of the chain connecting pins 16, or one of the chain connecting pins 16 and the chain connecting pin 16A, to form an inner link. The inner link plates 14 are interconnected in an alternating manner with the outer link plates 12 by the chain connecting pins 16 and 16A in a conventional manner. Thus, the outer link plates 12 are arranged outside of the inner link plates 14 with respect to a center longitudinal plane of the bicycle drive chain 10.

Prior to installation of the chain connecting pin 16A to the outer and inner link plates 12 and 14, the chain connecting pin 16A includes a pin body 20, an inserting portion 22 and a connecting portion 24. The connecting portion 24 is positioned between the pin body 20 and the inserting portion 22. Thus, the connecting portion 24 interconnects the pin body 20 and the inserting portion 22.

Figure 6:
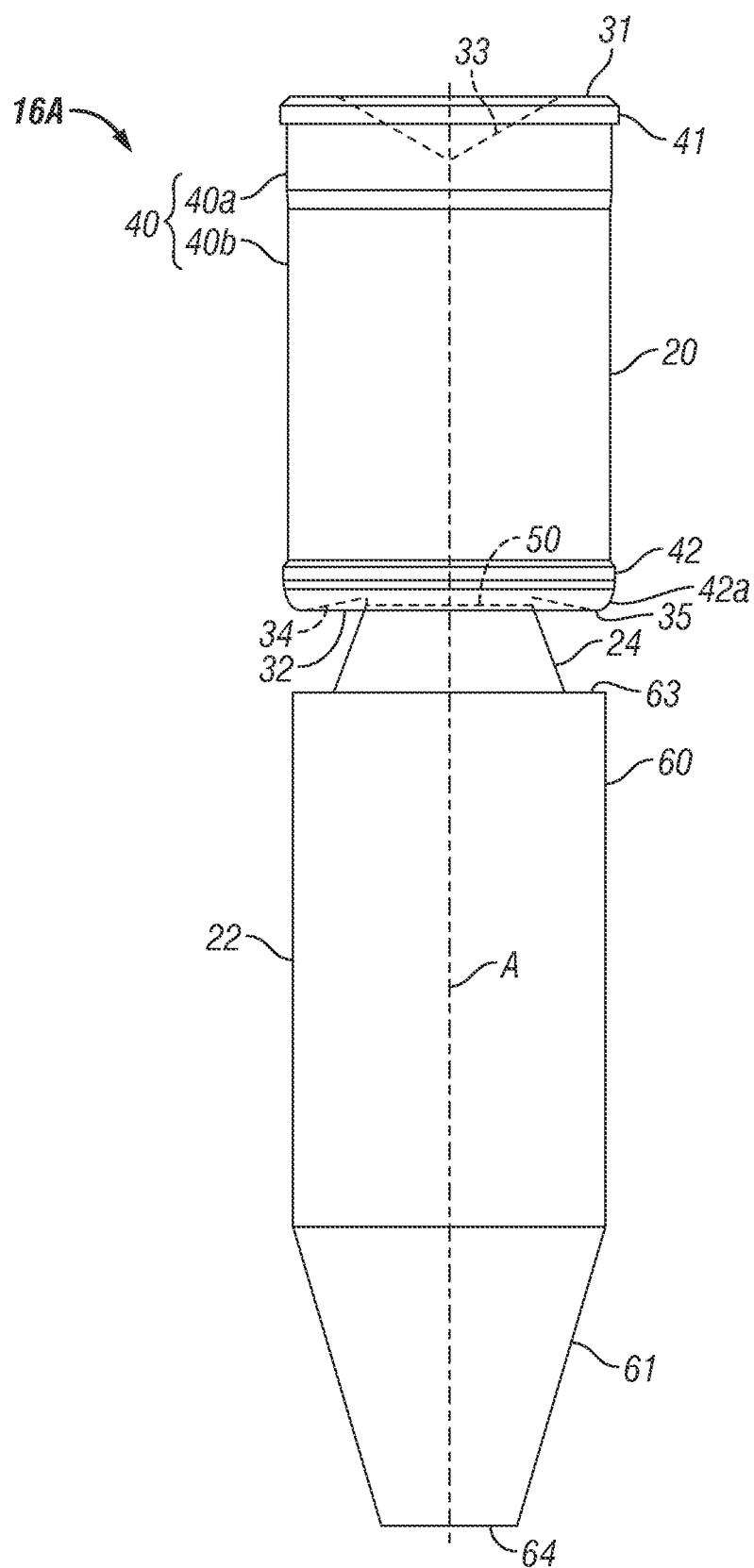
FIG. 6 is a side elevational view of one of the bicycle chain connecting pins of the bicycle chain that is illustrated in FIGS. 1 to 5 with a connecting portion and an insertion portion still attached thereto.

In one preferred embodiment illustrated in FIG. 6, the pin body 20, the inserting portion 22 and the connecting portion 24 are formed integrally with one another. Preferably, the chain connecting pin 16A is preferably formed as a one-piece, unitary member from a hard, rigid material such as a metallic material that is known to be used for manufacturing bicycle chains. For example, the chain connecting pin 16A can be made of nickel chrome molybdenum steel. Preferably, the chain connecting pin 16A is subjected to a surface hardening treatment to improve abrasion resistance.

The pin body 20 is actually used for the connection between the outer link plates 12 and the inner link plates 14 as the pin body 20 is forcibly inserted through the pin openings 12a of a pair of the outer link plates 12 and a pair of the pin openings 14a of the inner link plates 14. The inserting portion 22 is used for initially guiding the chain connecting pin 16A through the pair of the outer link plates 12 and the pair of the pin openings 14a of the inner link plates 14 during the assembly process of manufacturing the bicycle drive chain 10.

As explained below, the connecting portion 24 is configured to shear from the pin body 20 and remain attached to the inserting portion 22 after the pin body 20 is installed between a pair of adjacent links of the bicycle drive chain 10. Preferably, the pin body 20, the inserting portion 22 and the connecting portion 24 are formed integrally with one another. The connecting portion 24 preferably has a smaller maximum diameter than the pin body 20 and the inserting portion 22.

Figure 7:
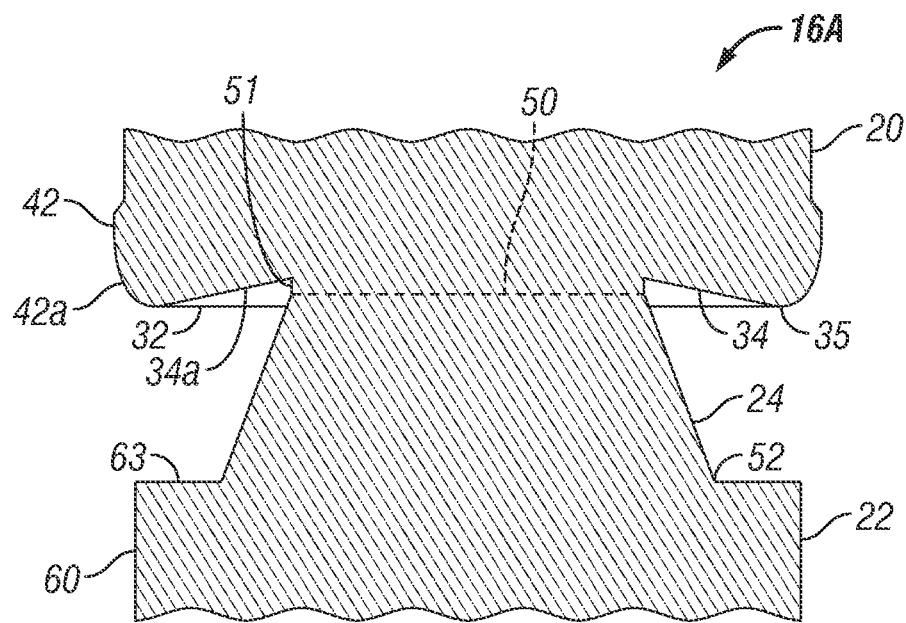
FIG. 7 is an enlarged longitudinal cross sectional view of a portion of the bicycle chain connecting pin that is illustrated in FIG. 6 with the connecting portion and the insertion portion still attached thereto.
Figure 8:
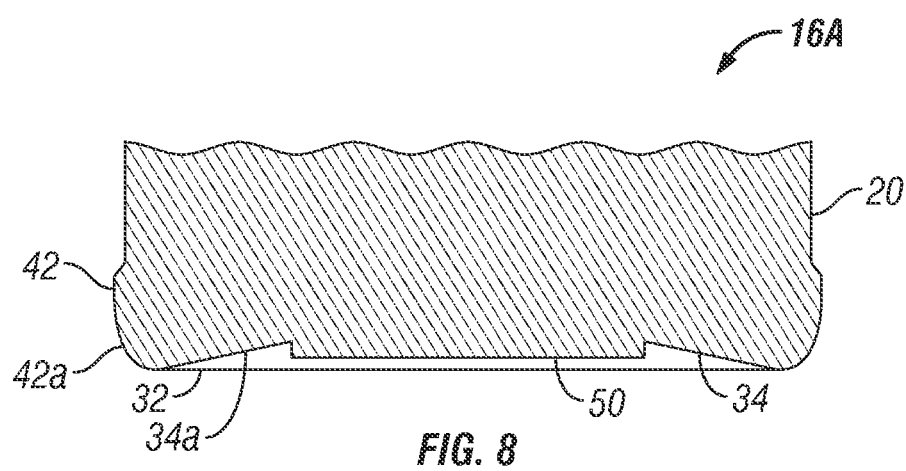
FIG. 8 is an enlarged longitudinal cross sectional view of a portion of the bicycle chain connecting pin that is illustrated in FIG. 4 with the connecting portion and the insertion portion detached.

The pin body 20 has a first axial end face 31 and a second axial end face 32. The pin body 20 has a length slightly greater than a lateral distance between the outer link plates 12 when the drive chain 10 is assembled. The first axial end face 31 of the pin body 20 includes a recess 33. Preferably, the recess 33 of the first axial end face 31 of the pin body 20 is conically shaped. The recess 33 can be used for receiving a tool that is used for installing the pin body 20 into a pair of adjacent links. The second axial end face 32 has a recessed surface 34 with respect to an outermost edge 35 of the second axial end face 32. As seen in FIGS. 7 and 8, the recessed surface 34 preferably includes a tapering part 34a that tapers closer toward the first axial end face 31 as the tapering part 34a extends in a direction from the outermost edge 35 of the second axial end face 32 toward a center axis of the pin body 20. While in the illustrated embodiment, the entire recessed surface 34 is formed by the tapering part 34a, the recessed surface 34 could have a non-tapering part if needed and/or desired.

In the illustrated embodiment, the pin body 20 further includes a center cylindrical part 40, a first flange 41 and a second flange 42. The center cylindrical part 40 of the pin body 20 has a maximum outer diameter that is greater than a maximum outer diameter or width of the inserting portion 22. The center cylindrical part 40 is preferably formed with two cylindrical sections 40a and 40b. The cylindrical section 40a may have a slightly larger diameter than the cylindrical section 40b. Both of the cylindrical sections 40a and 40b may have a maximum outer diameter that is greater than a maximum outer diameter or width of the inserting portion 22. The cylindrical section 40a has a diameter slightly larger than that of the pin opening 12a. The axial length of the cylindrical section 40a is preferably about equal to the thickness of the outer link plate 12.

The first flange 41 is disposed adjacent the first axial end face 31, while the second flange 42 is disposed adjacent the second axial end face 32. Thus, the first and second flanges 41 and 42 are disposed at opposite longitudinal ends of the center cylindrical part 40 for preventing the pin body 20 from inadvertently slipping out of the pin openings 12a. The second flange 42 includes a partial spherical surface 42a that extends in a radially outward direction from the outermost edge 35 of the second axial end face 32. The partial spherical surface 42a aids in the insertion of the pin body 20 into the pin opening 12a and 14a.

The connecting portion 24 will be discussed in more detail. The connecting portion 24 can be formed by annually cutting an intermediate peripheral section of the chain connecting pin 16A between the second flange 42 of the pin body 20 and the inserting portion 22. Thus, the connecting portion 24 has a reduced diameter relative to the pin body 20, and the inserting portion 22 so that the portion 3 can be easily detached from the pin body 20 by applying shearing force to the inserting portion 22. Moreover, the connecting portion 24 has an axial length that is preferably slightly shorter than the thickness of the outer link plate 12 so as to facilitate the insertion of the inserting portion 22 into the pin opening 12a.

The connecting portion 24 is preferably attached to the recessed surface 34 of the second axial end face 32 of the pin body 20 by a frangible connection 50. The frangible connection 50 constitutes a shear line between the pin body 20 and the connecting portion 24 where the connecting portion 24 will shear off of the pin body 20 when the inserting portion 22 is broken off. The connecting portion 24 is preferably frustoconically shaped so that the frangible connection 50 is located below a plane forming the second axial end face 32. In other words, the connecting portion 24 has a small diameter end 51 and a large diameter end 52. The small diameter end 51 is attached to the recessed surface 34 of the pin body 20 at the frangible connection 50. The large diameter end 51 is attached to the inserting portion 22. The connecting portion 24 has a reduced diameter relative to the pin body 20 and the inserting portion 22. The connecting portion 24 has an axial length that is preferably equal to or less than one millimeter.

Now the inserting portion 22 will be discussed in more detail. As mentioned above, the inserting portion 22 is attached to the connecting portion 24 (i.e., integrally formed in the illustrated embodiment). The inserting portion 22 preferably includes a cylindrical part 60 and a narrowing tip part 61. The cylindrical part 60 extends axially between the connecting portion 24 and the narrowing tip part 61. The narrowing tip part 61 narrows as the narrowing tip part 61 extends in a direction away from the connecting portion 24 toward a center axis A of the pin body 20.

Figure 9:
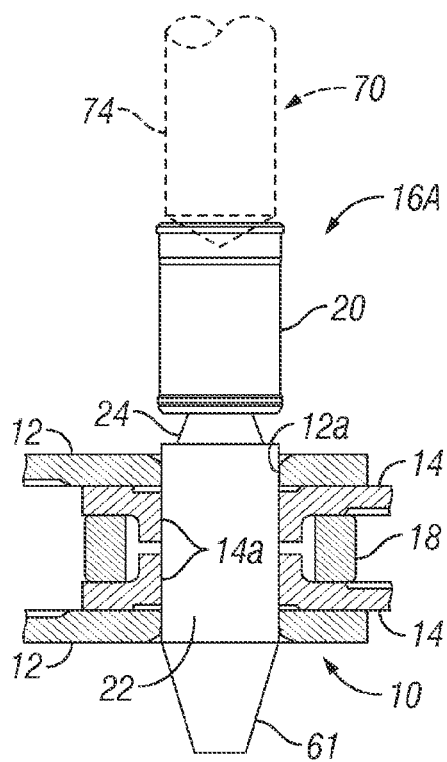
FIG. 9 is a cross sectional view of a portion of the bicycle chain with the insertion portion of the bicycle chain connecting pin interconnecting a pair of inner link plates and a pair of outer link plates.
Figure 10:
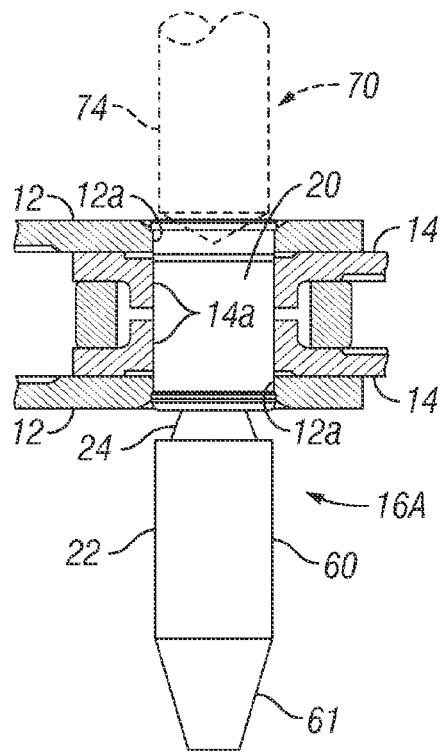
FIG. 10 is a cross sectional view of the portion of the bicycle chain that is illustrated in FIG. 9, but with the bicycle chain connecting pin inserted further such that the pin body is disposed in the openings of the inner and outer link plates.
Figure 11:
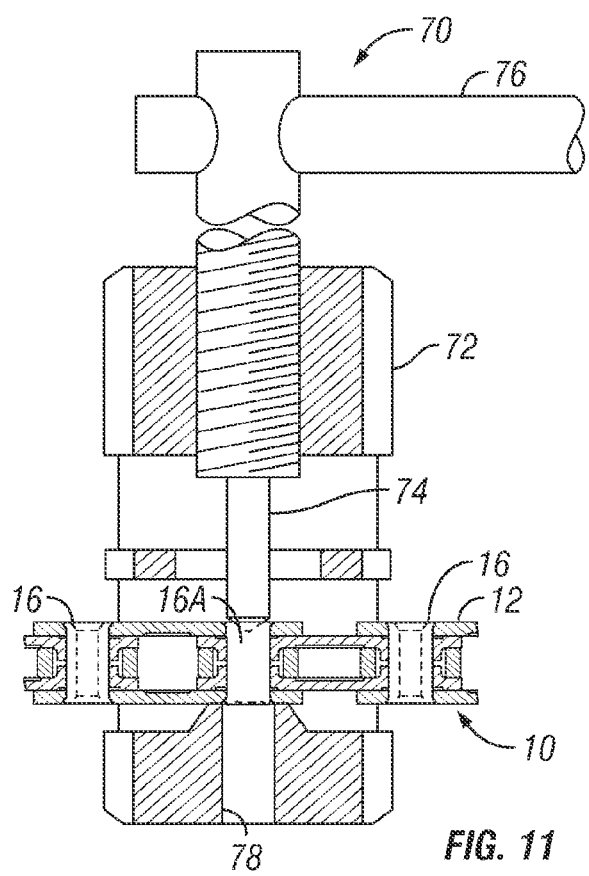
FIG. 11 is a cross sectional view of a portion of the bicycle chain with a pin attaching-detaching device illustrated to perform a connecting operation of the bicycle chain using one of the bicycle chain connecting pins.

Referring to FIGS. 9 to 11, a chain connecting operation using the chain connecting pin 16A having the above-described construction will now be more particularly described. Usually, in the chain connecting operation, a pin installation tool 70 is used for installing the chain connecting pin 16A into the pin openings 12a and 14a of the outer and inner link plates 12 and 14. As seen in FIG. 11, the pin installation and removal tool 70 has a cradle 72 for holding the drive chain during installation of the chain connecting pin 16A. The pin installation and removal tool 70 further has a driving pin 74 that is movably mounted to the cradle 72 for axial movement. Typically, the driving pin 74 has threaded portion that is threaded into a threaded bore of the cradle 72 such that rotation of the driving pin 74 causes the driving pin 74 to move axially. Preferably, the driving pin 74 has a handle 76 at one end for rotating the driving pin 72 relative to the cradle 72. Pin installation and removal tool such as the one illustrated are well known, and thus, the pin installation and removal tool 70 will not be discussed and/or illustrated in detail herein.

First, for connecting free ends of a disconnected chain, the inner end faces of the outer link plates 12 are overlapped on the outer end faces of the inner link plates 14, with the pin openings 12a and 14a being aligned with each other In this condition, the inserting portion 22 is inserted through a first pair of the pin openings 12a and 14a and then through a second pair of the pin openings 12a and 14a as seen in FIG. 9. This can be done using by hand or by using the driving pin 74 depending on the maximum diameter of the inserting portion 22 relative to the diameters of the pin openings 12a and 14a, In any event, the first axial end face 31 of the pin body 20 is pushed so that the inserting portion 22 is disposed in the pin openings 12a and 14a as seen in FIG. 9. Next, as seen in FIGS. 9 and 10, the driving pin 74 is used to insert the pin body 20 into the pin openings 12a and 14a so that the first and second flanges 41 and 42 engage the outer end faces of the outer link plates 12.

As seen in FIG. 10, once the pin body 20 is disposed in the pin openings 12a and 14a, the inserting portion 22 substantially entirely projects out of the outer link plate 12. Then, this projecting inserting portion 22 is fitted into a receiving hole 78 of the pin installation and removal tool 70, and the pin installation and removal tool 70 is wrenched relative to the drive chain 10. As a result, the connecting portion 24 is sheared way from the pin body 20 at the frangible connection 50. Because the connecting portion 24 is attached to the recessed surface 34 of the pin body 20, the remaining connecting portion does not protrude outward from a pin body after the chain connecting operation is completed so as to prevent undesirable contacts of the remaining connecting portion with other components, such as a sprocket, a derailleur, and so on. Finally, if needed, the drive chain 10 can be reinstalled into the pin installation and removal tool 70 to deform the second flange 42 for more securely fixing the chain connecting pin 16A.

In the foregoing embodiment, the inserting portion 22 is formed with the cylindrical part 60 and the narrowing tip part 61. Instead, this inserting portion 22 can have a different configuration. For instance, it is conceivable to form the entire inserting portion 22 with a tapered shape. Also, the length of this inserting portion 22 is not limited to the one described in the foregoing embodiment.

The foregoing embodiment has been described by way of the bicycle drive chain. However, it is to be understood that the connecting pin and the connecting method of the present invention can be used in many other applications for connecting various elements having through holes.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. Also it will be understood that although the terms first and second may be used herein to describe various components these components should not be limited by these terms. These terms are only used to distinguish one component from another. Thus, for example, a first component discussed above could be termed a second component and vice-a-versa without departing from the teachings of the present invention. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is clamed is:

1. A chain connecting pin comprising:
  a pin body having
    a center cylindrical part having an outer diameter,
    a first axial end face and a second axial end face, the second axial end face having a recessed surface with respect to an outermost edge of the second axial end face,
    a first flange disposed adjacent the first axial end face, and
    a second flange disposed adjacent the second axial end face;
  a connecting portion attached to the recessed surface of the second axial end face of the pin body; and
  an inserting portion attached to the connecting portion and haying a maximum outer width, the outer diameter of the center cylindrical part being greater than the maximum outer width of the inserting portion.

2. The chain connecting pin according to claim 1, wherein the connecting portion is attached to the recessed surface of the second axial end face by a frangible connection.

3. The chain connecting pin according to claim 1, wherein the pin body, the connecting portion and the inserting portion are formed integrally with one another.

4. The chain connecting pin according to claim 1, wherein the recessed surface includes a tapering part that tapers closer toward the first axial end face as the tapering part extends in a direction from the outermost edge of the second axial end face toward a center axis of the pin body.

5. The chain connecting pin according to claim 1, wherein the connecting portion is frustoconically shaped, and has a large diameter end attached to the inserting portion and a small diameter end attached to the recessed surface of the pin body.

6. The chain connecting pin according to claim 1, wherein the connecting portion has a reduced diameter relative to the pin body and the inserting portion.

7. The chain connecting pin according to claim 1, wherein the connecting portion has an axial length that is equal to or less than one millimeter.

8. The chain connecting pin according to claim 1, wherein the second flange includes a partial spherical surface that extends in a radially outward direction from the outermost edge of the second axial end face.

9. The chain connecting pin according to claim 1, wherein the inserting portion includes a narrowing tip part that narrows as the narrowing tip part extends in a direction away from the connecting portion toward a center axis of the pin body.

10. The chain connecting pin according to claim 9, wherein the inserting portion further includes a cylindrical part extending axially between the connecting portion and the narrowing tip part.

11. The chain connecting pin according to claim 1, wherein the first axial end face of the pin body includes a recess.

12. The chain connecting pin according to claim 11, wherein the recess of the first axial end face of the pin body is conically shaped.

* * * * *